United States Patent
Shimizu et al.

(10) Patent No.: US 9,979,697 B2
(45) Date of Patent: May 22, 2018

(54) PACKET FILTERING APPARATUS AND PACKET FILTERING METHOD

(71) Applicant: MITSUBISHI ELECTRIC CORPORATION, Tokyo (JP)

(72) Inventors: Koichi Shimizu, Tokyo (JP); Teruyoshi Yamaguchi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days. days.

(21) Appl. No.: 15/559,787

(22) PCT Filed: May 15, 2015

(86) PCT No.: PCT/JP2015/064024
§ 371 (c)(1),
(2) Date: Sep. 19, 2017

(87) PCT Pub. No.: WO2016/185513
PCT Pub. Date: Nov. 24, 2016

(65) Prior Publication Data
US 2018/0069835 A1 Mar. 8, 2018

(51) Int. Cl.
H04L 29/06 (2006.01)

(52) U.S. Cl.
CPC ...... *H04L 63/0263* (2013.01); *H04L 63/1416* (2013.01); *H04L 69/22* (2013.01)

(58) Field of Classification Search
CPC .. H04L 63/0263; H04L 63/1416; H04L 69/22
See application file for complete search history.

(56) References Cited

U.S. PATENT DOCUMENTS

| 5,493,504 A | 2/1996 | Minato |
| 6,473,763 B1 | 10/2002 | Corl, Jr. et al. |

(Continued)

FOREIGN PATENT DOCUMENTS

| JP | 6-215065 A | 8/1994 |
| JP | 2000-174808 A | 6/2000 |

(Continued)

OTHER PUBLICATIONS

El-Atawy et al., "Adaptive Early Packet Filtering for Defending Firewalls against DoS Attacks", 2009, pp. 1-9.

(Continued)

*Primary Examiner* — Sarah Su
(74) *Attorney, Agent, or Firm* — Birch, Stewart, Kolasch & Birch, LLP

(57) ABSTRACT

The present invention relates to: a packet filtering apparatus that represents a rule set for packet filtering being a technique for preventing a cyber-attack, using a tree structure suitable for calculation of a logical expression, thereby improving processing efficiency; and a packet filtering method thereof.

The packet filtering apparatus includes: a rule set containing a rule in which a condition and an action are associated with each other, and a Zero-Suppressed Binary Decision Diagram (ZDD) that represents a logical expression in which the condition of the rule is described using a logical variable; a packet analyzing unit to analyze a packet received from a network and extract collation information being a character string to be collated; and a filtering unit to collate the collation information extracted by the packet analyzing unit with the ZDD, execute the action associated with the condition that the collation information matches, and permit or deny communication of the packet.

5 Claims, 7 Drawing Sheets

(56) References Cited

U.S. PATENT DOCUMENTS

| | | | |
|---|---|---|---|
| 6,651,096 B1 | 11/2003 | Gai et al. | |
| 7,540,025 B2 | 5/2009 | Tzadikario | |
| 2003/0033531 A1 | 2/2003 | Hanner | |
| 2003/0051165 A1 | 3/2003 | Krishnan et al. | |
| 2005/0286522 A1 | 12/2005 | Paddon et al. | |
| 2005/0289181 A1 | 12/2005 | Deninger et al. | |
| 2007/0094204 A1* | 4/2007 | Huelsman | G06N 5/04 706/47 |
| 2010/0037016 A1 | 2/2010 | Stergiou et al. | |
| 2010/0158161 A1 | 6/2010 | Sambhwani et al. | |
| 2012/0042374 A1 | 2/2012 | Paddon et al. | |
| 2013/0235884 A1* | 9/2013 | Mamidwar | H04L 5/0044 370/468 |
| 2014/0142961 A1* | 5/2014 | Luter | G06F 19/363 705/2 |
| 2014/0282854 A1 | 9/2014 | Clark et al. | |
| 2015/0128200 A1* | 5/2015 | Mamidwar | H04N 21/42615 725/116 |
| 2017/0076046 A1* | 3/2017 | Barnes | G06F 17/30864 |

FOREIGN PATENT DOCUMENTS

| | | |
|---|---|---|
| JP | 2002-16644 A | 1/2002 |
| JP | 2007-208861 A | 8/2007 |
| JP | 2011-54179 A | 3/2011 |
| TW | 201112647 A1 | 4/2011 |

OTHER PUBLICATIONS

Sasao et al., "Applications of Zero-Suppressed Decision Diagrams", 2014, Total of 33 pages.

* cited by examiner

Fig. 4
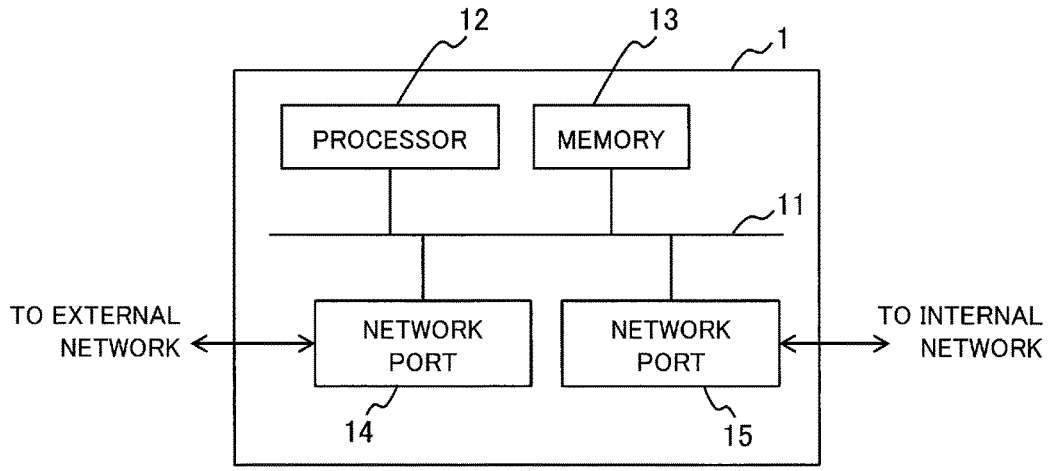
Fig. 5
| RULE | CONDITION | | ACTION |
|---|---|---|---|
| | TRANSMISSION SOURCE ADDRESS | TRANSMISSION DESTINATION ADDRESS | |
| R1 | 192.168.0.* | 192.168.0.* | PERMIT |
| R2 | 192.168.1.10 | 192.168.0.* | PERMIT |
| R3 | 192.168.1.* | 192.168.0.* | DENY |
Fig. 6
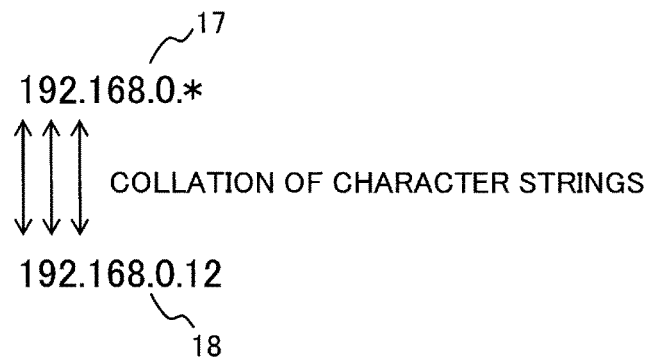

NOT $f(R1) + f(R2)$, BUT $f(R1) + \overline{f(R1)}f(R2)$

Fig. 11

RULE
$f(x_1, x_2, x_3) = x_1\overline{x_2}x_3 + \overline{x_1}x_2\overline{x_3}$ ~42

| PACKET | $x_1\ x_2\ x_3$ | $f(x_1, x_2, x_3)$ | CALCULATION RESULT USING ZDD | |
|---|---|---|---|---|
| 1 | 0 0 0 | 0 | 0 | |
| 2 | 0 0 1 | 0 | 0 | |
| 3 | 0 1 0 | 1 | 1 | |
| 4 | 0 1 1 | 0 | 1 | ← INCORRECT |
| 5 | 1 0 0 | 0 | 0 | |
| 6 | 1 0 1 | 1 | 1 | |
| 7 | 1 1 0 | 0 | 0 | |
| 8 | 1 1 1 | 0 | 1 | ← INCORRECT |

~43

PACKET FILTERING APPARATUS AND PACKET FILTERING METHOD

TECHNICAL FIELD

The present invention relates to: a packet filtering apparatus that represents a rule set for packet filtering being a technique for preventing a cyber-attack, using a tree structure suitable for calculation of a logical expression, thereby improving processing efficiency; and a packet filtering method thereof.

BACKGROUND ART

The cyber-attack on an information system is rapidly increasing, and a countermeasure against the cyber-attack is required. As an intrusion route of the cyber-attack, a network and a USB memory are well known. Conventionally, as a technique for preventing the cyber-attack from the network, there is a packet filter. The packet filter has a mechanism to permit or deny a packet to pass in accordance with the rule set. The rule set consists of a condition to be satisfied by the packet and a rule describing an action of when the packet satisfies the condition. The action herein is to permit or deny the packet to pass. There is order in a sequence of rules within the rule set, and the packet is collated with the rule in accordance with the order. "The packet matches the rule" or "the packet and the rule much" means that the packet satisfies the condition described in the rule. When receiving the packet, the packet filter collates the packet with the rule in accordance with the order within the rule set. If the packet matches the rule, the packet is permitted or denied in accordance with the action defined in the rule. If the packet does not match the rule, it is continued to collate the packet with a next rule. At the end of the rule set, a rule called a default rule which matches all packets is set. Accordingly, even if the packet does not match any other rule, the packet is always processed by the default rule.

As the system and the attack on the system become more complicated, a corresponding rule set for packet filtering becomes larger. On the other hand, since the packet is collated with the rule one by one in accordance with the order, as the number of rules increases, in proportion to that, it takes longer to complete collation. Therefore, a technique for improving processing efficiency is necessary.

Patent Literature 1 discloses a technique for speeding up a packet filter by swapping order of rules within a rule set. An idea of Patent Literature 1 is to improve processing efficiency by moving a rule which matches a packet more frequently earlier in the order, and a rule which matches a packet less frequently later in the order. For that purpose, the rules are dynamically swapped in the rule set. That is, at a time of operating the packet filter, the number of times each rule matches a packet is recorded, and in accordance with that number of times, the rules are swapped. However, it is not allowed to result in changing meaning of the rule set by swapping the rules. Thus, only when two rules do not conflict with each other, these two rules are swapped. Here, the two rules are said to conflict with each other if actions of these rules are different, and if there is an overlap in any of conditions described in these rules. For example, a condition specified in a destination address is considered. If a range from 192.168.0.1 to 192.168.0.100 is described in a rule as a condition, and a range from 192.168.0.50 to 192.168.0.150 is described in other rule as a condition, these conditions are overlapped with each other.

Non-Patent Literature 1 discloses a technique for speeding up a packet filter by, before performing usual collation, performing other collation processing to filter out most of packets at high speed. If it is supposed that a rule is a logical expression and a bit string of a packet is a value to be substituted into the logical expression, the packet matches the rule only when a value of the logical expression is 1 and matching is limited at that time. Therefore, collation of the packet with the rule can be realized by the calculation of the logical expression. Hence, high speed collation can be realized by a data structure suitable for the calculation of the value of the logical expression. In Non-Patent Literature 1, the high speed collation is realized by a data structure which is a tree structure called a BDD. However, since a large storage area is necessary in order to represent the rule set using the BDD, it is difficult to represent the entire rule set using the BDD. Hence, scanning a tree of the BDD is terminated to a certain depth. This is performed as preprocessing of the original packet filter, the most of packets are filtered out, and the usual collation processing is performed on remaining packets. Thus, it is possible to shorten a time to process the entire packet filter.

CITATION LIST

Patent Literature

Patent Literature 1: JP 2000-174808 A

Non-Patent Literature

Non-Patent Literature 1: El-Atawy, et al., "Adaptive Early Packet Filtering for Defending Firewalls against DoS Attacks," IEEE INFOCOM, 2009.

SUMMARY OF INVENTION

Technical Problem

In the packet filter using the BDD described in Non-Patent Literature 1, the BDD is the data structure which is the tree structure. Thus, as a depth of the tree structure increases, the necessary storage area exponentially increases. Therefore, a problem arises that since the entire rule set cannot be held in the storage area, processing using the BDD need be terminated to the certain depth.

The present invention has been conceived to solve a problem described above and aims to realize a high speed packet filter by enabling an entire rule set to be processed with a tree structure suitable for calculation of a logical expression.

Solution to Problem

In order to solve the problem described above, a packet filtering apparatus according to the present invention includes: a rule set containing a rule in which a condition and an action are associated with each other, and a Zero-Suppressed Binary Decision Diagram (ZDD) that represents a logical expression in which the condition of the rule is described using a logical variable; a packet analyzing unit to analyze a packet received from a network and extract collation information being a character string to be collated; and a filtering unit to collate the collation information extracted by the packet analyzing unit with the ZDD, execute the action associated with the condition that the collation information matches, and permit or deny communication of the packet.

Further, a packet filtering method according to the present invention is a packet filtering method of a packet filtering apparatus including a storage unit to store a rule set containing a rule in which a condition and an action are associated with each other, and a Zero-Suppressed Binary Decision Diagram (ZDD) that represents a logical expression in which the condition of the rule is described using a logical variable, a packet analyzing unit, and a filtering unit. The packet filtering method includes: a packet analyzing step to analyze a packet received from a network and extract collation information being a character string to be collated, by the packet analyzing unit; and a filtering step to collate the collation information extracted by the packet analyzing unit with the ZDD stored in the storage unit, execute the action associated with the condition that the collation information matches, and permit or deny communication of the packet, by the filtering unit.

Advantageous Effects of Invention

In accordance with the present invention, an effect can be obtained such that it is possible to reduce a data size to be held for calculation of a logical expression by describing the logical expression using a ZDD, and although a calculation error occurs when the ZDD is used for the calculation of the logical expression, it is also possible to calculate the logical expression correctly at high speed by providing a mechanism to correct the error.

BRIEF DESCRIPTION OF DRAWINGS

FIG. 4 is a diagram illustrating a hardware configuration example of an intrusion detection apparatus 1.

FIG. 5 is a diagram illustrating an example of a rule set for detecting intrusion.

FIG. 6 is a diagram explaining collation of character strings of a packet and a rule.

FIG. 11 is a diagram illustrating an example of a calculation result of a logical expression using the ZDD.

DESCRIPTION OF EMBODIMENTS

First Embodiment

Hereinafter, a configuration and an operation of a packet filtering apparatus according to the present embodiment will be described with reference to drawings.

Figure 1:
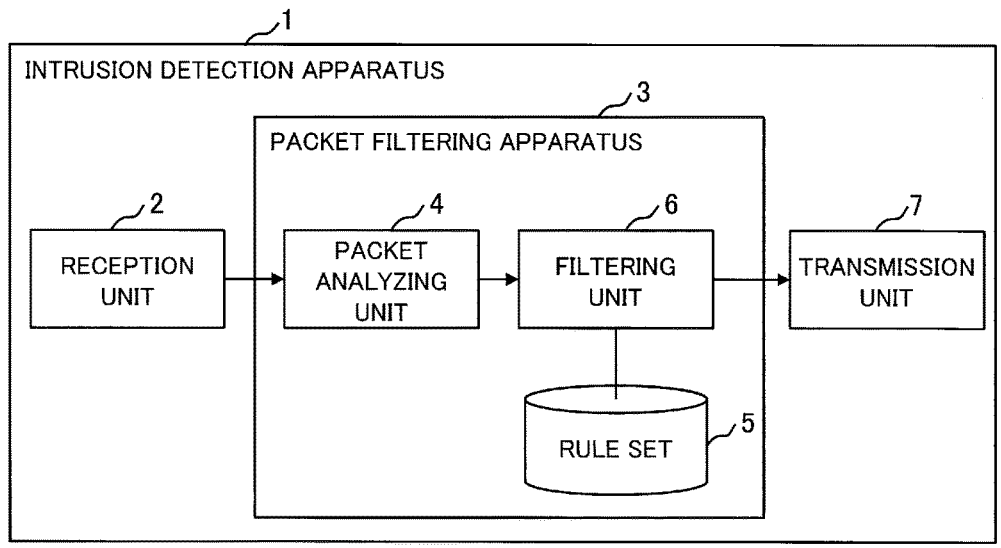
FIG. 1 is a diagram illustrating a configuration example of a packet filtering apparatus according to a first embodiment.

FIG. 1 is a diagram illustrating a configuration example of the packet filtering apparatus according to a first embodiment.

Figure 2:
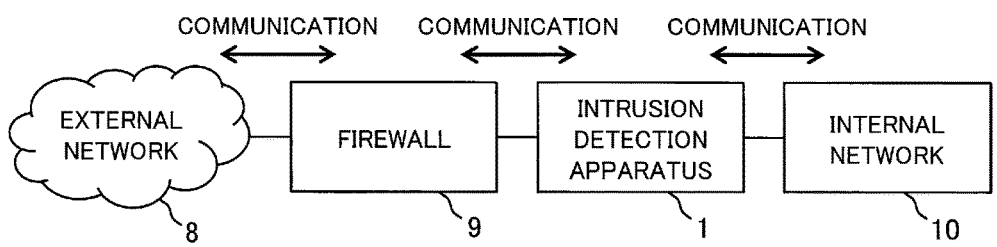
FIG. 2 is a diagram illustrating a network configuration example (No. 1) of an intrusion detection apparatus to which the packet filtering apparatus according to the first embodiment is applied.

FIG. 2 is a diagram illustrating a network configuration example (No. 1) of an intrusion detection apparatus to which the packet filtering apparatus according to the first embodiment is applied.

Figure 3:
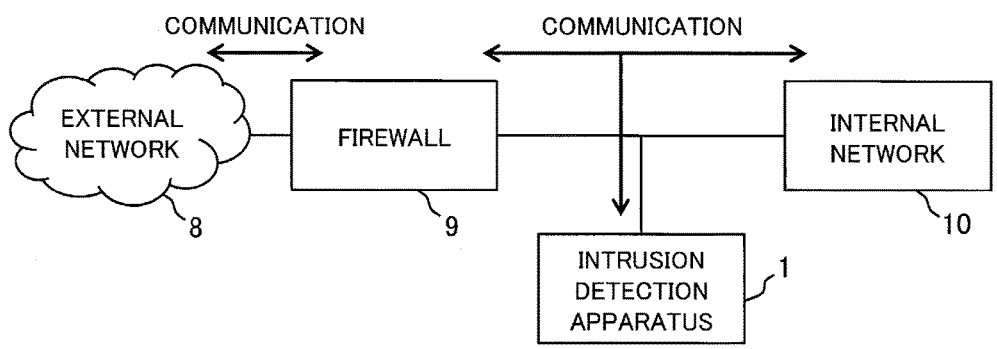
FIG. 3 is a diagram illustrating a network configuration example (No. 2) of the intrusion detection apparatus to which the packet filtering apparatus according to the first embodiment is applied.

FIG. 3 is a diagram illustrating a network configuration example (No. 2) of the intrusion detection apparatus to which the packet filtering apparatus according to the first embodiment is applied.

Firstly, network configuration examples to which the packet filtering apparatus is applied will be described with reference to FIGS. 2 and 3.

In order to protect security of an in-house LAN upon connecting the in-house LAN to the Internet, it is usual to install an apparatus called a firewall that controls communication between the in-house LAN and the Internet, at a boundary between the in-house LAN and the Internet. FIG. 2 illustrates a configuration in which the intrusion detection apparatus is added to a standard network configuration as described above. That is, an internal network 10 such as the in-house LAN is connected to an external network 8 such as the Internet, via an intrusion detection apparatus 1 and a firewall 9. Here, although the firewall 9 and the intrusion detection apparatus 1 are illustrated as different blocks due to a functional difference, the firewall 9 and the intrusion detection apparatus 1 may be different apparatuses or the same apparatus, as a physical apparatus.

Further, the network configuration of FIG. 3 illustrates another example of the network configuration to which the packet filtering apparatus is applied. A difference from FIG. 2 is a position where the intrusion detection apparatus 1 is installed. In FIG. 2, the intrusion detection apparatus 1 is installed at the midway of a communication line connecting the firewall 9 and the internal network 10, and communication between the firewall 9 and the internal network 10 is blocked. However, in FIG. 3, the intrusion detection apparatus 1 is installed at the end of a communication line which is branched from the midway of a communication line between the firewall 9 and the internal network 10, and communication between the firewall 9 and the internal network 10 is not blocked. This difference in the installation position is associated with how to process a packet as a result of intrusion detection to the packet. That is, in a case where the packet is blocked as the result of intrusion detection, the configuration of FIG. 2 is necessary. In a case where the packet is not blocked, and for example, only an alert is raised, the configuration of FIG. 3 is sufficient.

Next, with reference to FIG. 1, the configuration of the packet filtering apparatus according to the first embodiment will be described.

In FIG. 1, the intrusion detection apparatus 1 includes a reception unit 2 that receives a packet passed through the firewall 9, a packet filtering apparatus 3 that permits or denies communication of the received packet, and a transmission unit 7 that transmits the packet the communication of which has been permitted to an internal network.

The packet filtering apparatus 3 includes a packet analyzing unit 4, a rule set 5, and a filtering unit 6.

The packet analyzing unit 4 analyzes the received packet and extracts collation information to be collated with a condition of a rule. The rule set 5 contains the rule in which the condition and an action are associated with each other. The filtering unit 6 collates the collation information extracted from the packet with the condition of the rule and executes the action of the rule such that the collation information matches the condition.

FIG. 4 is a diagram illustrating a hardware configuration example of the intrusion detection apparatus 1.

In FIG. 4, the intrusion detection apparatus 1 is realized as a hardware configuration which is the same as that of a general computer, and has a configuration in which a processor 12, a memory 13, and network ports 14 and 15 for a LAN and the like are connected to a bus 11. In the configuration of FIG. 4, two network ports are included on the assumption of the system configuration of FIG. 2, and the network port 14 is connected to the external network side and the network port 15 is connected to the internal network side.

The reception unit 2 is the network port 14, and the transmission unit 7 is the network port 15.

The processor 12 is a Central Processing Unit (CPU) or the like that executes a program. The memory 13 is, for example, a Random Access Memory (RAM) or the like.

The program is loaded into the memory 13 to be sequentially read and executed by the processor 12. This program is a program that realizes functions described as the packet analyzing unit 4 and the filtering unit 6 constituting the packet filtering apparatus 3.

Further, information and data stored in the rule set 5, and information, data, a signal value, and a variable value indicating a result of processing of the filtering unit 6 are stored as a file in the memory 13.

Note that the configuration of FIG. 4 is merely an example of a hardware configuration of each apparatus, and the hardware configuration of each apparatus is not limited to the configuration illustrated in FIG. 4, but may be another configuration.

Next, a rule contained in the rule set 5 of the packet filtering apparatus 3 will be described in detail.

FIG. 5 is a diagram illustrating an example of a rule set for detecting intrusion.

FIG. 5 illustrates a rule set 16 consisting of 3 rules, as the example of the rule set for detecting intrusion. As an example of the rule, the rule set 16 indicates an example in which a transmission source address and a transmission destination address of an IP packet are collated as a condition, and communication is permitted or denied as an action in accordance with a collation result. An asterisk * included in the rule represents a wildcard allowing an arbitrary value. A rule R1 means that if the transmission source address and the transmission destination address of a packet are 192.168.0.*and 192.168.0.*,respectively, communication of that packet is permitted. A rule R2 means that if the transmission source address and the transmission destination address of a packet are 192.168.1.10 and 192.168.0.*,respectively, communication of that packet is permitted. A rule R3 means that if the transmission source address and the transmission destination address of a packet are 192.168.1.*and 192.168.0.*, respectively, communication of that packet is denied.

Usually, packets and rules are collated sequentially from the rule at the top of the rule set 16. Therefore, although a packet whose transmission source address is 192.168.1.10 and transmission destination address is 192.168.0.*satisfies both of the rules R2 and R3, the rule R2 is collated first, and thus, communication is permitted in accordance with a collation result with the rule R2. However, such control of communication based on transmission source and transmission destination addresses is usually a function of the firewall 9. Although the intrusion detection apparatus 1 usually controls the communication utilizing more detailed data besides the addresses, for explanation, the example of controlling the communication using only the addresses is described here.

Usually, the rule set 16 of FIG. 5 is described as a text file, and the collation of packets and rules described above is realized as collation of character strings.

FIG. 6 is a diagram explaining collation of character strings of a packet and a rule.

In FIG. 6, it is determined whether or not the rule and the packet match by comparing, character by character, a character string 17 of the transmission source address described in the rule and a character string 18 of the transmission source address of the packet.

Next, there will be explained an example in which a rule set for packet filtering is described by a logical expression.

Figure 7:
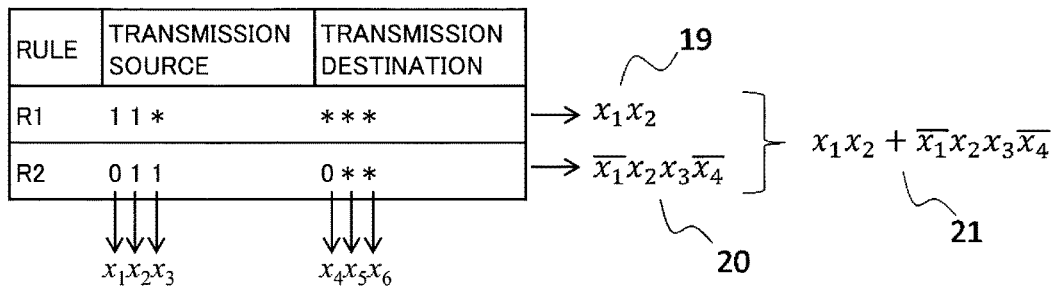
FIG. 7 is a diagram explaining an example in which a rule set is described by a logical expression.

FIG. 7 is a diagram explaining the example in which the rule set is described by the logical expression.

In FIG. 7, for simplicity, an address is a 3-bit value (an integer value in a range from 0 to 7), and an action of when a rule and a packet matches is omitted. Moreover, values of transmission source and transmission destination that are conditions of matching are represented in binary notation. For example, a rule R1 matches a packet whose transmission source address is 11* and transmission destination address is ***. If this is represented in decimal notation, the rule R1 matches a packet whose transmission source address is 6 or 7 and transmission destination address is in a range from 0 to 7.

Here, 6 bits in total which are the transmission source and transmission destination addresses are used as a condition. It is supposed that the respective 6 bits are regarded as logical variables $x1, x2, \ldots,$ and $x6$. Then, the rule R1 is satisfied when both of $x1$ and $x2$ are 1, and the values of the other logical variables may be any value.

Such a condition can be represented by a logical product of logical variables. In a case of the rule R1, it can be represented as a logical product 19. In fact, since the logical product 19 is 1 only when both of $x1$ and $x2$ are 1, the matching of the packet and the rule can be determined based on whether or not the value of the logical product 19 is 1.

Similarly, a rule R2 can be represented as a logical product 20, and a rule in which the rules R1 and R2 are combined can be represented as a logical sum 21 of those. However, in general, there is a dependency relationship between rules, and a filtering result changes depending on order in which the rules are collated. Therefore, it is necessary to note that such a dependency relationship will be lost if a logical sum such as 21 is simply taken. In order to prevent this, it is necessary to change the rule before taking the logical sum and to take a logical sum as indicated in 22. In 22, it is assumed that f(R) represents a logical expression corresponding to a rule R. In 22, a logical product 23 means that "the rule R1 is not satisfied, and the rule R2 is satisfied". Thus, in a case where the rule R1 is satisfied, the logical product 23 is not satisfied. That is, whether or not the rule R2 is satisfied is ignored. Therefore, it is understood that the original dependency relationship is realized in which the rule R1 is collated first.

Next, there will be described an example in which the above logical expression is represented by a tree structure.

Figure 8:
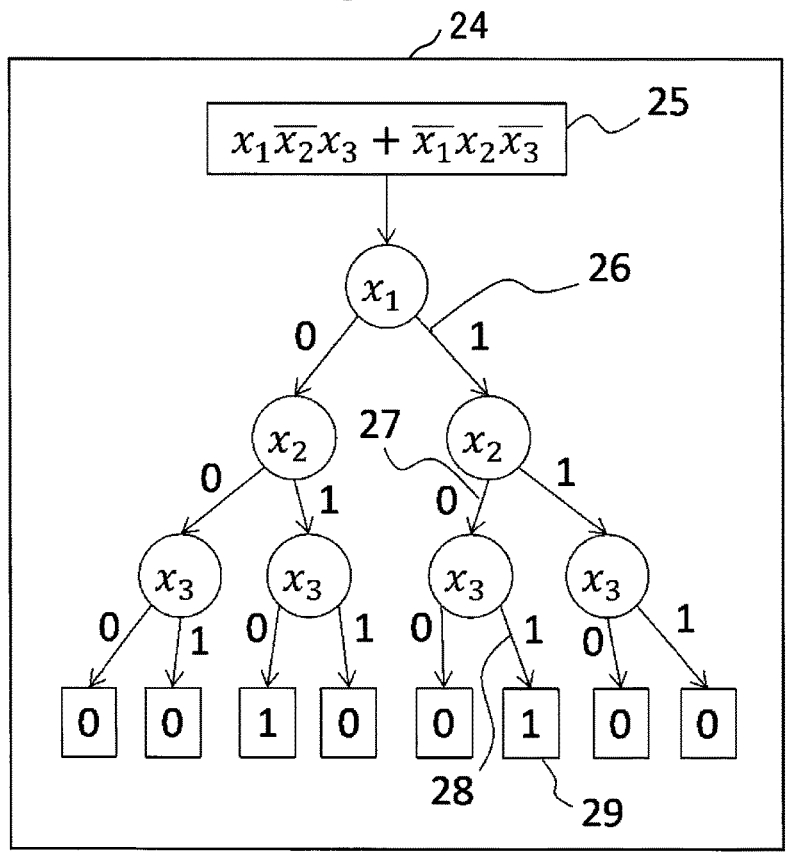
FIG. 8 is a diagram explaining an example in which a logical expression is represented by a tree structure.

FIG. 8 is a diagram explaining the example in which the logical expression is represented by the tree structure.

In 24 of FIG. 8, a logical expression 25 is represented by the tree structure called a binary decision tree. In the binary decision tree, if a branch is followed in accordance with a value of a logical variable, a value of a logical expression is given as a terminal node. For example, the value of the logical expression 25 for (x1, x2, x3)=(1, 0, 1) is 1, calculation of which corresponds to following branches 26, 27, and 28 and checking a value of a terminal node 29 in the binary decision tree. In this manner, by using the binary decision tree, it is possible to obtain the value of the logical expression by scanning the same number of branches as the number of logical variables. Thus, in particular, when the number of logical variables increases so that the logical expression becomes complicated, the value of the logical expression can be obtained faster than arithmetically operating the logical expression. Therefore, it is possible to realize a high speed packet filter by representing a rule of the packet filter using a logical expression as illustrated in FIG. 7 and by representing the rule of the packet filter using a tree structure as illustrated in FIG. 8.

However, in a simplest binary decision tree such as 24, all of branches corresponding to values 0 and 1 of each logical variable are held as data. Thus, if the number of logical variables increases, a storage area necessary for holding the data exponentially increases so that it becomes impossible to store all the data.

Accordingly, as a basic idea of the present invention, a logical expression is calculated by a data structure called a Zero-Suppressed Binary Decision Diagram (ZDD) in which a binary decision tree is simplified.

Figure 9:
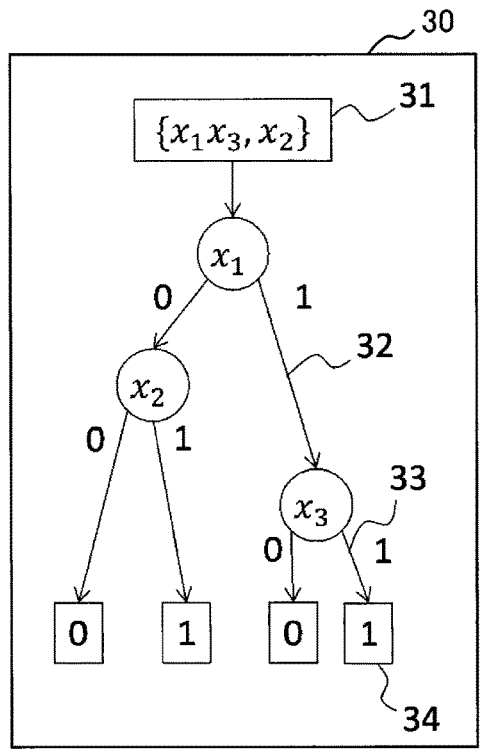
FIG. 9 is a diagram illustrating an example in which a logical expression is represented by a data structure using a ZDD.

FIG. 9 is a diagram illustrating an example in which the logical expression is represented by the data structure using the ZDD.

In FIG. 9, a ZDD 30 is a simplified version of the binary decision tree 24 in accordance with a simplification rule described below. The ZDD is a data structure suitable for performing an operation on a combination set such as 31. The combination set is a set whose element is a combination of variables. In the ZDD, it is possible to efficiently determine whether or not data satisfies the combination set. In the ZDD 30, it is possible to determine whether or not data satisfies a combination x1x3, or x2. For example, following branches 32 and 33 leads to a terminal node 34, and the value of the terminal node 34 is 1. This corresponds to that (x1, x3)=(1, 1) satisfies the combination set, specifically, satisfies the combination x1x3. Here, in principal, although it is necessary to check that x2=0, that check is omitted and it can be said that only the check of 1 is performed in the ZDD. Therefore, if it is sparse data such that most of bits are 0, most of checks are omitted. In this manner, in the ZDD, it is known that a storage area necessary for holding data can exponentially be reduced in some cases.

Next, the simplification rule of the binary decision tree will be described.

Figure 10:
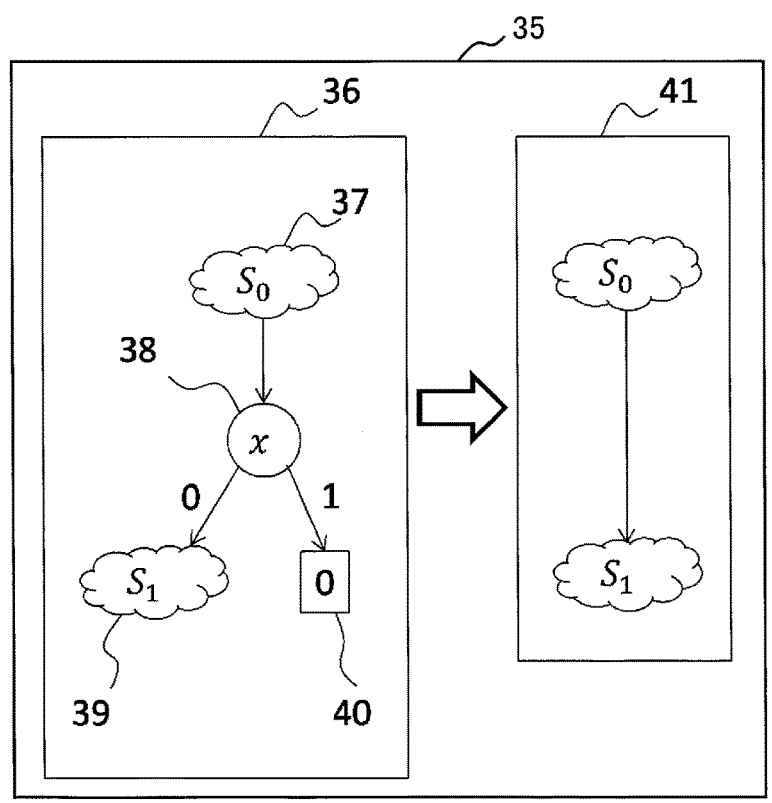
FIG. 10 is a diagram explaining a simplification rule of a binary decision tree.

FIG. 10 is a diagram explaining the simplification rule of the binary decision tree.

35 of FIG. 10 schematically indicates the simplification rule. In a binary decision tree 36, attention is paid to a node 38. It is assumed that a branch source of the node 38 is a subtree 37, a destination branched from the node 38 with a value 0 is a subtree 39, a destination branched from the node 38 with a value 1 is a terminal node 40, and the value of the terminal node 40 is 0. In this manner, when a destination branched from a certain node with a value 1 is a terminal node whose value is 0, that node is deleted, and preceding and following subtrees are connected. In a case of the binary decision tree 36, the node 38 is deleted, simplification to connect the subtree 37 and the subtree 39 is executed, and a simplified binary decision tree 41 is obtained.

In the present invention, the ZDD is utilized not for an operation on a combination set, but for calculation of a logical expression.

FIG. 11 is a diagram illustrating an example of a calculation result of a logical expression using the ZDD.

In FIG. 11, the logical expression to be calculated is 42, and this is the same as 25 in FIG. 8. This logical expression is represented by the ZDD indicated by 30 in FIG. 9, and a value of this logical expression is calculated by following branches of the ZDD indicated by 30. Calculation results obtained in this way is indicated in FIG. 11.

However, in the calculation results of FIG. 11, it is found that in cases of (x1, x2, x3)=(0, 1, 1) and (1, 1, 1), the calculation results using the ZDD are incorrect. This is because a check whether or not a value is 0 is omitted in the ZDD. For example, in a case of (x1, x2, x3)=(1, 1, 1) in the ZDD 30 of FIG. 9, a value of the logical expression is determined to be 1 by following the branch 32 and branch 33 and reaching the terminal node 34. In this process, a check whether or not a value of a variable x2 is 0 is omitted, and only (x1, x3)=(1, 1) is checked. At a time when (x1, x3)=(1, 1), in addition to that, if x2=0, (x1, x2, x3) =(1, 0, 1). Substituting this set of values into the logical expression 42 will result in 1 so that the calculation result using the ZDD is correct. This result corresponds to a packet 6 of a table 43. However, if x2=1, (x1, x2, x3)=(1, 1, 1). Substituting this set of values into the logical expression 42 will result in 0 so that the calculation result using the ZDD is incorrect. This result corresponds to a packet 8 of the table 43. On the other hand, in a case where the calculation result using the ZDD is 0, that is, in a case where a terminal node whose value is 0 is reached as a result of following a branch, this calculation result is correct even if a check whether or not a value is 0 is omitted in the middle, that is, even if a value of a logical variable whose check is omitted is any value. This fact is derived from the simplification rule indicated in 35 of FIG. 10.

As described above, since the logical expression is not accurately calculated by the ZDD, a mechanism for correcting that is necessary. A calculation error using the ZDD occurs when a calculation result using the ZDD is 1 and when a logical variable whose value is 1 is included in logical variables whose check of values is omitted during a calculation process using the ZDD. Therefore, when the calculation result using the ZDD is 1, the calculation result using the ZDD is correct if all of values of variables are 0, the values whose check is omitted during the calculation process of the ZDD. Otherwise, the calculation result using the ZDD is incorrect, and a correct result is 0. From this fact, when the calculation result using the ZDD is 1, the correct result can be obtained by checking whether or not all of the values are 0 with respect to the variables whose check of values is omitted during the calculation process of the ZDD.

However, checking only a value of a specific logical variable is costly in such a way that a number identifying that logical variable need be stored. Therefore, in the present invention, in order to check all of the logical variables at once, a mechanism below is provided for the filtering unit 6. In the filtering unit 6, every time a value of a logical variable is checked during the calculation process using the ZDD, the value of the logical variable is rewritten to 0. However, if the value is originally 0, the value can be left as 0. When such a process is performed, in a case where the calculation result using the ZDD is 1, all of logical variables whose values should be 1 are rewritten to 0, and remaining logical variables whose check of values is omitted should be 0. Therefore, rather than determining whether or not the values of individual logical variables are equal to 0, it is determined whether or not the value of all of the logical variables as a whole is equal to 0. If equal to 0, a determination result of the whole is confirmed as 1. If not equal to 0, the determination result of the whole is confirmed as 0. Such 0 determination can usually be executed by a single instruction of a CPU. On the other hand, as previously mentioned, when the calculation result using the ZDD is 0, such 0 determination is not necessary, and the value of the logical expression is confirmed as 0.

Including the correction process of the calculation error, the calculation of the logical expression using the ZDD described above will be described in detail below with reference to a flowchart.

Figure 12:
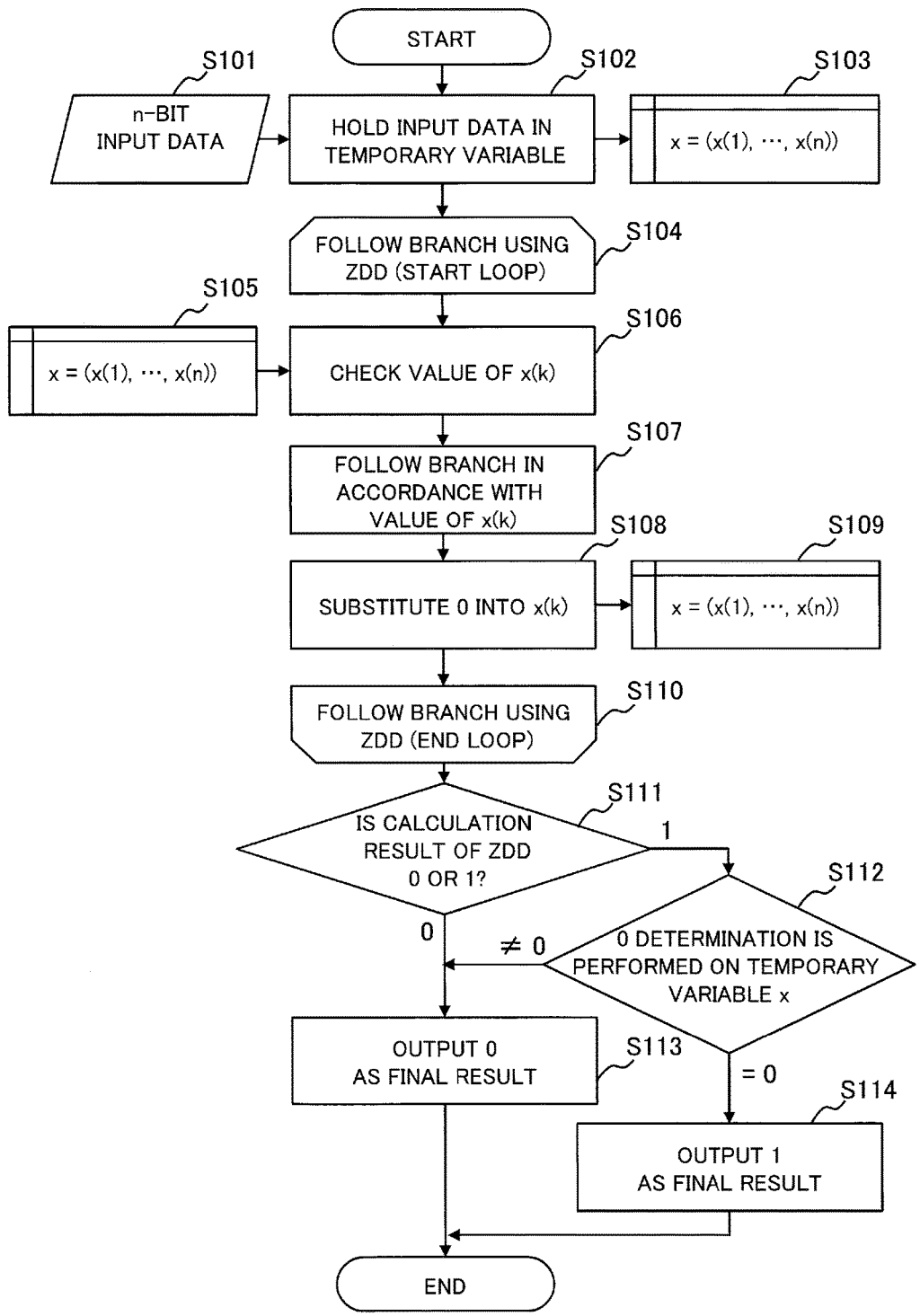
FIG. 12 is a flowchart illustrating a calculation flow of the logical expression using the ZDD.

FIG. 12 is the flowchart illustrating a calculation flow of the logical expression using the ZDD.

Processes of FIG. 12 are executed by the filtering unit 6.

Firstly, in a step S101, n-bit input data 44 is input to the filtering unit 6. This input data corresponds to the collation information to be collated with the condition of the rule output by the packet analyzing unit 4. In a step S102, the filtering unit 6 holds the input data 44 in an n-bit temporary variable 45. Here, it is assumed that a k-th bit of the input data corresponds to a logical variable $x(k)$, and a k-th bit of the temporary variable 45 is represented as $x(k)$.

Further, if it is assumed that x represents the entire n-bit temporary variable 45, $x=(x(1), \ldots, x(n))$.

Next, steps S104 to S110 are a loop corresponding to a process of following a branch in the ZDD. According to this, the calculation of the logical expression using the ZDD is executed. If it is assumed that $x(k)$ is a logical variable of a node which is currently paid attention in the ZDD, a value of $x(k)$ being the k-th bit of the temporary variable is checked in a step S106. In accordance with that value, the branch is followed in a step S107. Then, $x(k)$ being the k-th bit of the temporary variable is set to 0 in a step S108. When the calculation of the ZDD has been completed, the loop is exited and the process is branched in accordance with the calculation result of the ZDD in a step S111. If the calculation result is 0, it is confirmed that this is a correct result so that 0 is output as a final result in a step S113. On the other hand, if the calculation result is 1 in the step S111, it is not yet confirmed whether or not this calculation result is correct. Thus, in order to confirm that, the process proceeds to the 0 determination in a step S112.

In the step S112, it is determined whether or not the temporary variable x is 0. If 0, 1 is output as the final result in a step S114. If not 0, 0 is output as the final result in the step S113. However, in the 0 determination in the step S112, the 0determination for each bit $x(k)$ is not performed n times in total, but the 0 determination for the n-bit value x is performed once.

As described above, an effect can be obtained such that, in the packet filtering apparatus of the first embodiment, it is possible to reduce a data size to be held for calculation of a logical expression by describing the logical expression using a ZDD, and although a calculation error occurs when the ZDD is used for the calculation of the logical expression, it is also possible to calculate the logical expression correctly at high speed by providing a mechanism to correct the error.

Second Embodiment

For sparse data such that most of bits are 0, a ZDD increases an effect of reducing a size by simplification. Hence, there is a possibility that the size can be further reduced at a time when a logical expression is described using the ZDD by converting a logical variable to make data sparse by utilizing statistical property of actual communication generated in a target system before describing a rule of a packet filter as the logical expression. Hence, in the second embodiment, by performing a bit inversion process on packet data depending on whether a rate at which each bit in the packet data is 0 is high or a rate at which each bit in the packet data is 1 is high, the rate at which each bit is 0 will be higher in the packet data after inversion. The rate at which each bit of the packet data is 0 or 1 can be obtained by observing the actual communication in advance before full operation of the target system.

Figure 13:
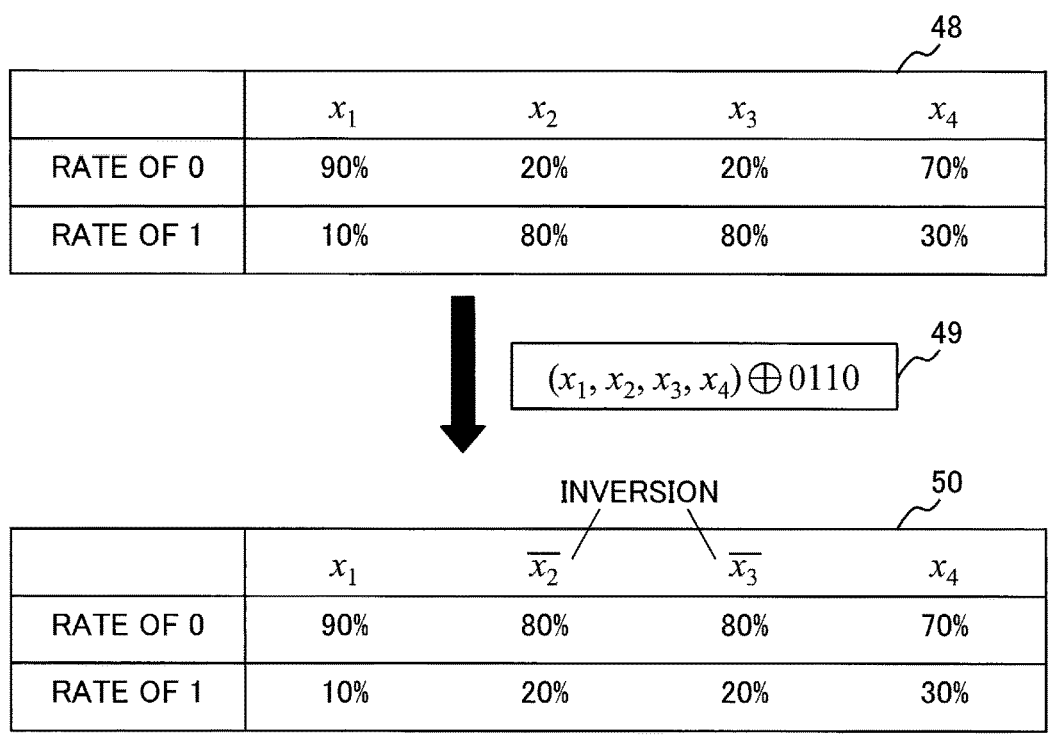
FIG. 13 is a diagram explaining a bit inversion process according to a second embodiment.

FIG. 13 is a diagram explaining a bit inversion process according to the second embodiment.

FIG. 13 illustrates a method of making the rate at which each bit in the packet data is 0 higher by inverting values of logical variables.

In FIG. 13, it is assumed that the packet data has length of 4 bits, and each bit is associated with logical variable $x1, \ldots, x4$. If, for example, 100 packets flowing in the actual communication are observed, 100 values are obtained for the first bits of the packets, and statistical data on how many of them are 0 and how many of them are 1 is obtained. In this manner, a table 48 illustrates an example of the statistical data obtained as a result of observing the actual communication in a certain system.

In the table 48, a rate at which the first bit $x1$ of a packet is 0 is 90%, and a rate at which the first bit $x1$ of the packet is 1 is 10%. In the first bit, the rate at which 0 appears is higher. Therefore, when the ZDD is used to express the logical expression, it is expected that a part related to $x1$ will be largely simplified. On the other hand, a rate at which the second bit $x2$ is 0 is 20%, and a rate at which the second bit $x2$ is 1 is 80%. In the second bit, the rate at which 1 appears is higher. Therefore, when the ZDD is used to express the logical expression, it is considered that a part related to $x2$ is not much simplified. Hence, by inverting a value of the second bit, the rate of 0 is set to 80%, and the rate of 1 is set to 20%. As a result, the rate at which 0 appears becomes higher in the inverted second bit. When the ZDD is used to express the logical expression, it is expected that a part related to the inverted $x2$ will be largely simplified.

Note that inversion of a bit corresponds to taking logical negation for a logical variable, and "the inverted $x2$" means "logical negation of $x2$". The same applies to the third and fourth bits. As a whole, if exclusive OR with a 4-bit value 0110 is performed on a 4-bit value $(x1, x2, x3, x4)$ as illustrated in a logical expression 49 and values of the second and third bits are thereby inverted, it is possible to make the rate at which 0 appears is higher in all of the bits as illustrated in a table 50. In this manner, if a rule for a packet subjected to the bit inversion process is expressed as the logical expression and converted to the ZDD, which is equivalent to creating the ZDD for the sparse data, the small-sized ZDD can be obtained. In this manner, the ZDD created with performing the bit inversion process is called a bit inversion ZDD. Here, since an original bit and a bit obtained by inverting its value correspond to each other, a filtering result for the packet after the bit inversion is equal to a filtering result for the original packet. Therefore, the same filtering result as the original can be obtained while the size of the ZDD is reduced by the bit inversion process.

As described above, based on the observation result of the actual communication of the target system, the bit inversion process is performed as needed so that the rate at which the value is 0 is higher in all of the bits and thus the data becomes sparse. Therefore, an effect can be obtained such that when the rule for the packet filter is expressed by the logical expression using the logical variables corresponding to the sparse data and the rule is expressed using the ZDD, it is possible to reduce the size of the ZDD.

REFERENCE SIGNS LIST

1: intrusion detection apparatus; 2: reception unit; 3: packet filtering apparatus; 4: packet analyzing unit; 5: rule set; 6: filtering unit; 7: transmission unit; 8: external network; 9: firewall; 10: internal network; 11: bus; 12: processor; 13: memory; 14, 15: network port; 16: example of a rule set; 17: character string of a transmission source address described in a rule; 18: character string of a transmission source address of a packet; 19 to 23, 25, 42, 49: logical expression; 24, 36: binary decision tree; 26 to 28: branch; 29, 40: terminal node; 30: ZDD; 31: combination set; 32, 33: branch; 34: terminal node; 35: simplification rule; 37, 39: subtree; 38: node; 41: simplified binary decision tree; 43: calculation result using a ZDD; 44: input data; 45: temporary variable; 48: example of statistical data obtained as a result of observing actual communication; and 50: example of a bit inversion process

The invention claimed is:

1. A packet filtering apparatus comprising:
a memory to store a rule set containing a rule in which a condition and an action are associated with each other, and a Zero-Suppressed Binary Decision Diagram (ZDD) that represents a logical expression in which the condition of the rule is described using a logical variable; and
a processing circuitry to analyze a packet received from a network and extract collation information being a character string to be collated, collate the collation information extracted with the ZDD, execute the action associated with the condition that the collation information matches, and permit or deny communication of the packet,
wherein the processing circuitry, in collation of the collation information with the ZDD, overwrites a value of the logical variable for which collation has been completed with 0, and determines whether or not a value of the logical expression including the logical variable overwritten with 0 is 0 when collation on the entire ZDD has been completed.

2. The packet filtering apparatus according to claim 1,
wherein the processing circuitry, when the collation on the entire ZDD has been completed, in a case where the value of the logical expression calculated using the ZDD is 0, sets a determination result of the value of the logical expression to 0, in a case where the value of the logical expression calculated using the ZDD is 1, sets the determination result of the value of the logical expression to 1 if the value of the logical expression including the logical variable overwritten with 0 is 0, and sets the determination result of the value of the logical expression to 0 if the value of the logical expression including the logical variable overwritten with 0 is not 0.

3. A packet filtering apparatus comprising:
a memory to store a rule set containing a rule in which a condition and an action are associated with each other, and a Zero-Suppressed Binary Decision Diagram (ZDD) that represents a logical expression in which the condition of the rule is described using a logical variable; and
a processing circuitry to analyze a packet received from a network and extract collation information being a character string to be collated, collate the collation information extracted with the ZDD, execute the action associated with the condition that the collation information matches, and permit or deny communication of the packet,
wherein the rule set contains a bit inverted ZDD that represents the logical expression in which a value of a bit of the logical variable is inverted in accordance with statistical appearance tendency of 0 and 1 of the collation information obtained by observing the packet, and
wherein the processing circuitry collates the collation information with the ZDD using the bit inverted ZDD contained in the rule set.

4. A packet filtering method comprising:
analyzing a packet received from a network and extracting collation information being a character string to be collated; and
collating the extracted collation information with a Zero-Suppressed Binary Decision Diagram (ZDD) contained in a rule set containing a rule in which a condition and an action are associated with each other, and the ZDD that represents a logical expression in which the condition of the rule is described using a logical variable, executing the action associated with the condition that the collation information matches, and permitting or denying communication of the packet,
wherein the collating, in collation of the collation information with the ZDD, overwrites a value of the logical variable for which collation has been completed with 0, and determines whether or not a value of the logical expression including the logical variable overwritten with 0 is 0 when collation on the entire ZDD has been completed.

5. A packet filtering method comprising:
analyzing a packet received from a network and extracting collation information being a character string to be collated; and
collating the extracted collation information with a Zero-Suppressed Binary Decision Diagram (ZDD) contained in a rule set containing a rule in which a condition and an action are associated with each other, and the ZDD that represents a logical expression in which the condition of the rule is described using a logical variable, executing the action associated with the condition that the collation information matches, and permitting or denying communication of the packet,
wherein the rule set contains a bit inverted ZDD that represents the logical expression in which a value of a bit of the logical variable is inverted in accordance with statistical appearance tendency of 0 and 1 of the collation information obtained by observing the packet, and
wherein the collating collates the collation information with the ZDD using the bit inverted ZDD contained in the rule set.

* * * * *